US012595385B2

(12) United States Patent
Matsumoto et al.

(10) Patent No.: US 12,595,385 B2
(45) Date of Patent: Apr. 7, 2026

(54) INKJET INKS

(71) Applicant: Kao Corporation, Tokyo (JP)

(72) Inventors: Yuta Matsumoto, Cincinnati, OH (US); Daniel Sandker, Cincinnati, OH (US)

(73) Assignee: Kao Corporation, Tokyo (JP)

( * ) Notice: Subject to any disclaimer, the term of this patent is extended or adjusted under 35 U.S.C. 154(b) by 877 days.

(21) Appl. No.: 17/786,744

(22) PCT Filed: Dec. 20, 2019

(86) PCT No.: PCT/US2019/068010
§ 371 (c)(1),
(2) Date: Jun. 17, 2022

(87) PCT Pub. No.: WO2021/126264
PCT Pub. Date: Jun. 24, 2021

(65) Prior Publication Data

US 2023/0031477 A1 Feb. 2, 2023

(51) Int. Cl.
*C09D 11/108* (2014.01)
*B41M 5/00* (2006.01)
*C09D 11/32* (2014.01)
*C09D 11/36* (2014.01)
*C09D 11/38* (2014.01)

(52) U.S. Cl.
CPC ......... *C09D 11/108* (2013.01); *B41M 5/0047* (2013.01); *C09D 11/32* (2013.01); *C09D 11/36* (2013.01); *C09D 11/38* (2013.01)

(58) Field of Classification Search
CPC ........ C09D 11/03; C09D 11/107; C09D 11/36
See application file for complete search history.

(56) References Cited

U.S. PATENT DOCUMENTS 5,980,624 A * 11/1999 Ichikawa ............... C09D 11/16 106/31.86
6,022,910 A * 2/2000 Nishizaki ............... C09D 11/34 524/277
2015/0190318 A1 7/2015 Gu et al.
2015/0291816 A1 10/2015 Cross et al.
2017/0037269 A1 * 2/2017 Isobe ......................... B41J 2/01
2018/0251650 A1 9/2018 Xue et al.

FOREIGN PATENT DOCUMENTS

EP 2 872 582 B1 5/2016
JP 60-120771 A 6/1985
JP 63-51483 A 3/1988
JP 2000-7854 A 1/2000
JP 2000212495 A * 8/2000
JP 2003-268166 A 9/2003
JP 2004-98382 A 4/2004
JP 2005023099 A * 1/2005
JP 2017061637 A * 3/2017
JP 2020-186344 A 11/2020
JP 2021187905 A * 12/2021

OTHER PUBLICATIONS

Machine translation of JP 2000212495-A (2000, 6 pages).*
Machine translation of JP 2021187905-A (2021, 11 pages).*
Machine translation of JP 2005023099-A (2005, 5 pages).*
Machine translation of JP 2017-061637 (2017, 20 pages).*
International Search Report & Written Opinion issued Mar. 18, 2020 in PCT/US2019/068010, filed on Dec. 20, 2019, 8 pages.

* cited by examiner

*Primary Examiner* — Brieann R Johnston

(74) *Attorney, Agent, or Firm* — Oblon, McClelland, Maier & Neustadt, L.L.P.

(57) ABSTRACT

An inkjet ink that includes (A) a terpene phenol resin and (B) a compound of formula (I) wherein R is an alkyl group having 8 to 22 carbon atoms or an alkenyl group having 8 to 22 carbon atoms, n is 0 or 1, p is an integer from 1 to 40, and q is an integer from 1 to 40. A printed article including the inkjet ink in dried form, and a method of forming a printed image with a thermal inkjet printhead are also provided.

(I)

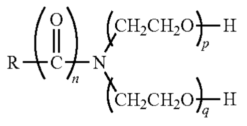

19 Claims, 1 Drawing Sheet

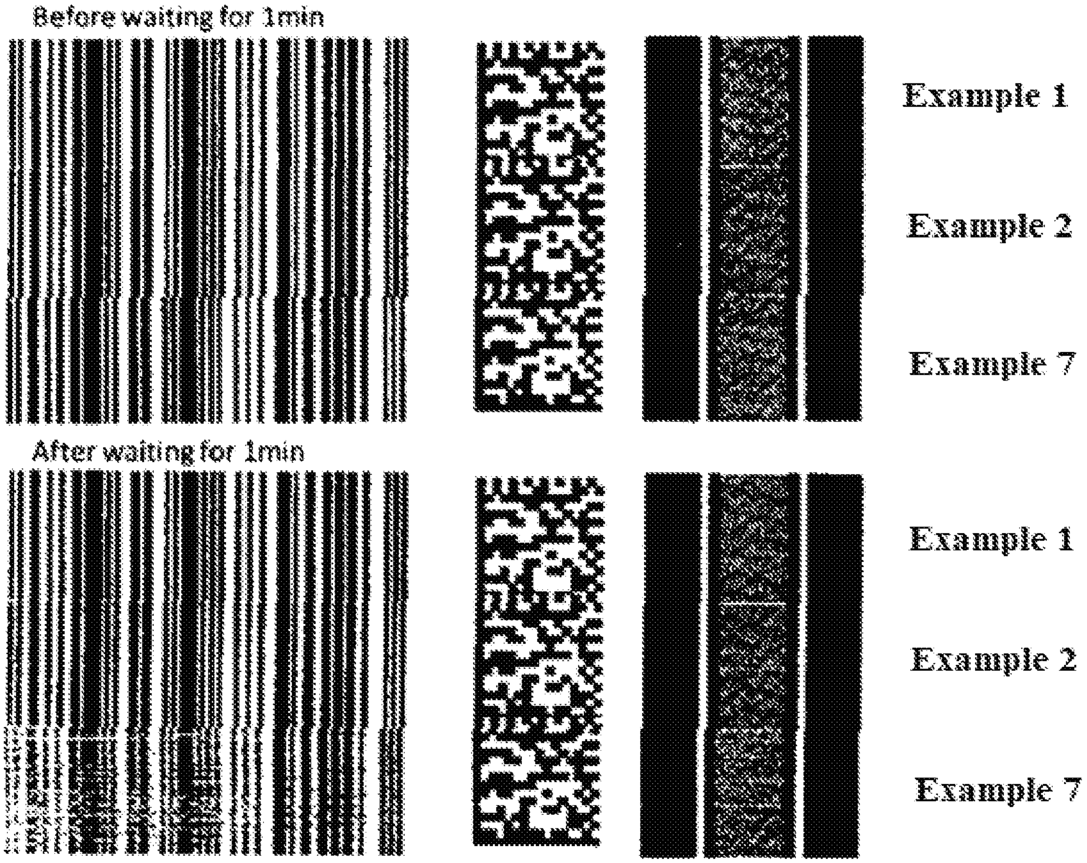
Before waiting for 1min
Example 1
Example 2
Example 7
After waiting for 1min
Example 1
Example 2
Example 7

INKJET INKS

BACKGROUND OF THE INVENTION

Field of the Invention

The present invention relates to inkjet inks, specifically inkjet inks that include (A) a terpene phenol resin and (B) a compound of a specific formula.

Discussion of the Background

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Thermal inkjet (TIJ) printing is a desirable technology for printing, coding, and marking as it offers high print resolutions at lower costs than competing technologies in the field, such as continuous inkjet methods. In thermal inkjet printing processes, the print cartridges contain a series of tiny chambers, each containing a heater, which produce ink droplets from thermal vaporization of an ink solvent. In the jetting process, a resistor is heated rapidly to produce a vapor bubble (hence the phrase "bubble jet"), which subsequently ejects a droplet from the orifice. This process is extremely efficient and reproducible and modern TIJ printheads for industrial graphics applications are capable of generating uniform drops of 4 pL or smaller in volume at frequencies of 36 kHz or greater.

However, thermal inkjet printing can be troubled by poor reliability over time. For example, some inkjet inks suffer from poor decap behavior (e.g., short decap times), in which solvent losses due to prolonged exposure to air within an uncapped printhead leads to clogging/plugging of printhead nozzles, and thus unreliable ink jetting and print quality (PQ) erosion over time. On the other hand, the use of special solvent systems with high boiling components devised to prevent such premature solvent losses in an uncapped printhead setting require extended drying times and thus inefficient overall printing processes. Therefore, it is often difficult to strike a balance between these competing issues of decap time (where the rate of solvent loss is too fast) and drying times (where the rate of solvent loss is too slow).

US 2015/0291816A1, which is incorporated herein by reference in its entirety, discloses an ink system with a reasonable balance between dry times and decap times by utilizing a terpene phenol resin in combination with a humectant. However, further improvements to decap and dry time performance are still needed.

Even when inks demonstrate reasonable dry and decap times, another problem encountered in thermal inkjet printing is during high volume (e.g., 200+ pages) printing operations, which tend to generate a gradual build-up of static charges as the number of printed pages increases, particularly during winter months or other low humidity conditions. The build-up of static charges that occur within the printing device can cause many problems that affect printing quality, one of which is an accumulation of solid ink components such as polymers and colorants in and around the nozzles of the print head once printing is stopped (static cling). As a consequence, once printing recommences, even after short (e.g., 1 minute) downtimes, the buildup of solid ink components may clog/plug the nozzle(s) or otherwise misdirect the ink path, causing poor print quality.

SUMMARY OF THE INVENTION

In view of the forgoing, there is a need for inkjet inks that have extended decap times, dry quickly once applied, and which provide reliable print quality during high volume printing operations by minimizing static-induced nozzle clogging/plugging effects.

Accordingly, it is one object of the present invention to provide novel inkjet inks that meet these criteria.

It is another object of the present disclosure to provide novel printed articles which contain a dried form of the inkjet inks.

It is another object of the present disclosure to provide novel methods of forming a printed image on a substrate by applying the inkjet inks onto the substrate and drying.

These and other objects, which will become apparent during the following detailed description, have been achieved by the inventors' discovery that the combination of a terpene phenol resin and a compound (discussed below) unexpectedly provides inkjet inks characterized by extended decap times, quick drying properties once applied, and reliable print quality during high volume printing operations.

Thus, the present invention provides:

(1) An inkjet ink, comprising:

(A) a terpene phenol resin; and (B) a compound of formula (I)

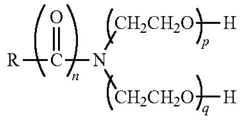

(I)

wherein:

R is an alkyl group having 8 to 22 carbon atoms or an alkenyl group having 8 to 22 carbon atoms, n is 0 or 1, p is an integer from 1 to 40, and q is an integer from 1 to 40.

(2) The inkjet ink of (1), wherein the terpene phenol resin (A) is a copolymer formed from a reaction between a monoterpene and a phenolic compound comprising at least one hydroxyl group and at least two replaceable hydrogen atoms in ortho- and/or para-positions with respect to the at least one hydroxyl group.

(3) The inkjet ink of (2), wherein the monoterpene is at least one bicyclic monoterpene selected from the group consisting of 3-carene, α-pinene, β-pinene, and camphene.

(4) The inkjet ink of (2) or (3), wherein the phenolic compound is phenol.

(5) The inkjet ink of any one of (1) to (4), wherein the terpene phenol resin (A) has a hydroxyl value of 10 to 75 mgKOH/g.

(6) The inkjet ink of any one of (1) to (5), wherein the terpene phenol resin (A) is present in an amount of 0.1 to 10 wt. %, based on a total weight of the inkjet ink.

(7) The inkjet ink of any one of (1) to (6), wherein the compound (B) is present in an amount of up to 5 wt. %, based on a total weight of the inkjet ink.

(8) The inkjet ink of any one of (1) to (7), wherein a weight ratio of the terpene phenol resin (A) to the compound (B) ((A):(B)) is 1:1 to 5:1.

(9) The inkjet ink of any one of (1) to (8), wherein n is 0.

(10) The inkjet ink of any one of (1) to (8), wherein n is 1.

(11) The inkjet ink of any one of (1) to (10), further comprising (C) an alkanolamine, wherein the alkanolamine (C) is present in an amount of 0.1 to 10 wt. %, based on a total weight of the inkjet ink.

(12) The inkjet ink of (11), wherein the alkanolamine (C) is at least one selected from the group consisting of ethanolamine, propanolamine, isopropanolamine, diethanolamine, and triethanolamine.

(13) The inkjet ink of any one of (1) to (12), further comprising (D) ethanol and (E) 1-propanol.

(14) The inkjet ink of (13), wherein a combined weight of ethanol (D) and 1-propanol (E) ((D)+(E)) in the inkjet ink is 50 to 95 wt. %, based on a total weight of the inkjet ink.

(15) The inkjet ink of any one of (1) to (14), further comprising (F) a silicone acrylate copolymer, wherein the silicone acrylate copolymer (F) is present in an amount of up to 5 wt. %, based on a total weight of the inkjet ink.

(16) The inkjet ink of any one of (1) to (15), further comprising (G) a colorant.

(17) A printed article, comprising:

a substrate and a dried form of the inkjet ink of any one of (1) to (16) disposed on the substrate.

(18) A method of forming a printed image on a substrate, comprising:

applying the inkjet ink of any one of (1) to (16) onto the substrate with a thermal inkjet printhead; and drying the inkjet ink.

(19) The method of (18), wherein the inkjet ink is dried by leaving exposed to air for seconds or less.

(20) The method of (18) or (19), wherein a heater is not employed for drying the inkjet ink.

BRIEF DESCRIPTION OF THE DRAWINGS

The foregoing paragraphs have been provided by way of general introduction, and are not intended to limit the scope of the following claims. The described embodiments, together with further advantages, will be best understood by reference to the following detailed description when considered in conjunction with the accompanying drawings, wherein:

FIG. 1 is a comparison of printing images (from left to right: Universal Product Code (UPC) 12 barcode, 2D Data Matrix, and Purge Bar) produced by Example inkjet inks 1, 2, and 7 at the end of a continuous, high volume printing run (print #500, top) versus the same printing image reprinted after a downtime of 1 minute (print #501, bottom).

DETAILED DESCRIPTION OF THE INVENTION

In the following description, it is understood that other embodiments may be utilized and structural and operational changes may be made without departure from the scope of the present embodiments disclosed herein.

The phrase "substantially free", unless otherwise specified, describes an amount of a particular component in the inkjet ink being less than 1 wt. %, preferably less than 0.5 wt. %, more preferably less than 0.1 wt. %, even more preferably less than 0.05 wt. %, yet even more preferably 0 wt. %, relative to a total weight of the inkjet ink.

As used herein, the terms "optional" or "optionally" means that the subsequently described event(s) can or cannot occur or the subsequently described component(s) may or may not be present (e.g., 0 wt. %).

The term "alkyl", as used herein, unless otherwise specified, refers to a linear, branched, or cyclic, saturated aliphatic fragment having 1 to 22 carbon atoms, preferably 2 to carbon atoms, preferably 3 to 18 carbon atoms. Examples of alkyl groups include, but are not limited to, methyl, ethyl, propyl, isopropyl, butyl, isobutyl, t-butyl, pentyl, isopentyl, neopentyl, hexyl, isohexyl, 3-methylpentyl, 2,2-dimethylbutyl, 2,3-dimethylbutyl, lauryl, myristyl, cetyl, stearyl, and the like, including guerbet-type alkyl groups (e.g., 2-methylpentyl, 2-ethylhexyl, 2-proylheptyl, 2-butyloctyl, 2-pentylnonyl, 2-hexyldecyl, 2-heptylundecyl, 2-octyldodecyl, 2-nonyltridecyl, 2-decyltetradecyl, and 2-undecylpentadecyl). Cycloalkyl is a type of cyclized alkyl group. Exemplary cycloalkyl groups include, but are not limited to, cyclopropyl, cyclobutyl, cyclopentyl, cyclohexyl, norbornyl, and adamantyl.

As used herein, the term "alkenyl", unless otherwise specified, refers to a linear, branched, or cyclic, aliphatic fragment having 2 to 22 carbon atoms, preferably 3 to 20 carbon atoms, preferably 4 to 18 carbon atoms, and which contains at least one site of unsaturation. Examples of alkenyl groups include, but are not limited to, vinyl, allyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl, 5-hexenyl, oleyl, linoleyl, and the like, including cycloalkenyl groups such as cyclopentenyl, cyclohexenyl, cycloheptenyl, and the like.

As used herein, the term "aryl" refers to an aromatic group containing only carbon in the aromatic ring(s), such as phenyl, biphenyl, naphthyl, anthracenyl, and the like.

As used herein, the term "fatty" describes a compound with a long-chain (linear) hydrophobic portion made up of hydrogen and anywhere from 8 to 22 carbon atoms, which may be fully saturated or partially unsaturated, and optionally attached to a polar functional group such as a hydroxyl group, an amine group, or a carboxyl group (e.g., carboxylic acid).

The term "(meth)acrylate" is used herein to refer to both acrylate and methacrylate groups. In other words, this term should be read as through "meth" is optional. Further, "(meth)acrylate" is used generally to refer to both acrylic acid-based compounds and acrylic ester-based compounds.

The term "decap behavior" herein, means the ability of the inkjet ink to readily eject from the printhead, upon prolonged exposure to air. The inkjet ink "decap time" is measured as the amount of time that an inkjet printhead may be left uncapped before the printer nozzles no longer fire properly, potentially because of clogging or plugging when printing resumes. Generally, nozzle(s) may become clogged (i.e., impeded, slowed) or plugged (i.e., obstructed, substantially or completely closed) by a viscous plug that forms in the nozzle(s) as a result of solvent loss, crusting of the ink, and/or kogation of various ink components in and/or around any of the nozzles. If a nozzle has become clogged, ink droplets ejected through the nozzle's orifice may be misdirected, which may adversely affect print quality. When an orifice is plugged, it becomes substantially or completely blocked. As a result of the nozzle being plugged, the ink droplets may not pass through the affected nozzle. Thus, the criteria for measuring failure to fire by a nozzle is a misdirection of ink through the nozzle's orifice to a lesser or greater degree, or a complete blockage, which can be measured by visually inspecting a printed image. In its simplest form, one method for determining decap time involves printing a given test pattern with the printhead nozzles to verify their working condition. This is followed by exposing the nozzles to air for a fixed time without printing or spitting the nozzles. Then, all of the nozzles are printed again in the given test pattern for a second time. The test patterns are then compared to determine the number of weak or misdirected nozzles. In the worst case, such nozzle clogging or plugging results in a complete failure to fire by the nozzle.

As used herein, the term "high-volume" refers to those printing operations that involve the printing of at least 200 pages, preferably at least 300 pages, preferably at least 400 pages, preferably at least 500 pages, preferably at least 600 pages, preferably at least 700 pages, preferably at least 800 pages, preferably at least 900 pages, preferably at least 1,000 pages.

Inkjet Inks

The present disclosure is directed to inkjet inks that possess suitable physical and chemical stability at both ambient temperatures and printhead operating temperatures, are jetted reliably, have prolonged decap times while still drying quickly after being applied onto a substrate (e.g., dry times of 30 seconds or less), and which prevent clogged nozzles caused by a buildup of static charges during high-volume printing operations. The combination of ingredients disclosed herein strikes a balance between fast dry times and extended decap time, and has been surprisingly found to prevent such static-induced nozzle clogging/plugging.

Inkjet inks of the present disclosure generally include the following components: (A) a terpene phenol resin and (B) a compound (discussed below), and optionally include one or more of (C) an alkanolamine, (D) ethanol, (E) 1-propanol, (F) a silicone acrylate copolymer, (G) a colorant, and (H) an additive.

(A) Terpene Phenol Resin

Terpene phenol resins (A) are the copolymeric reaction products from alkylation of one or more phenolic compounds with one or more terpenes, and have been used in inks and adhesives to provide a tackifier effect. As known by those of ordinary skill in the art, such resins may be readily obtained through copolymerization of a phenolic compound and a terpene monomer under the catalytic action of strong acids, metal salts having a condensing effect, bleaching earths, Friedel-Craft catalysts (e.g., boron trifluoride), and the like. The copolymeric reaction products may also have other constitutional units other than constitutional units derived from phenolic compounds and constitutional units derived from terpene. The amount of other constitutional units is preferably less than 5 mol %, preferably less than 3 mol %, preferably less than 1 mol %, preferably substantially free, based on the total constitutional units (100 mol %) of the copolymeric reaction products.

The terpene phenol resins (A) utilized herein may be based on any terpene having at least one olefinic double bond that is capable of being alkylated by a phenolic compound. Terpenes have a basic skeleton $(C_5H_8)_p$ where p is a positive integer that delineates the number of isoprene units that are successively bound head to tail. For example, hemiterpenes (p=1) have a $C_5H_8$ skeleton, monoterpenes (p=2) have a $C_{10}H_{16}$ skeleton, sesquiterpenes (p=3) have a $C_{15}H_{24}$ skeleton, and so forth.

In some embodiments, the terpene phenol resin (A) is based on monoterpene monomer units. The monoterpene may be a linear monoterpene (e.g., myrcene, ocimene, etc.), a monocyclic monoterpenes (e.g., limonene, γ-terpinene, α-phellandrene, β-phellandrene, terpinolene, etc.), or a bicyclic monoterpene (e.g., 3-carene, α-pinene, β-pinene, α-fenchene, camphene, etc.), including the various stereoisomers thereof, as well as mixtures thereof. In some embodiments, the monoterpene is a monocyclic monoterpene, with particular preference to limonene. In preferred embodiments, the monoterpene is a bicyclic monoterpene, with particular preference to 3-carene, α-pinene, β-pinene, and camphene, more preferably α-pinene and/or β-pinene.

A phenolic compound has at least one hydroxyl group directly bonded to a phenyl ring. All mono- or polyvalent phenolic compounds are useful in the preparation of the terpene phenol resin described herein provided that the phenolic compound has at least two replaceable hydrogen atoms in ortho- and/or para-positions with respect to at least one hydroxyl group. That is, the phenolic compound should be capable of being polyalkylated (e.g., bis-alkylated) with the terpene(s), and thus should have at least two available ortho-/para-positions with respect to at least one hydroxyl group for alkylation.

In preferred embodiments, the phenolic compound is phenol, which is considered the parent unsubstituted phenolic compound (i.e., contains one hydroxyl group bonded directly to the phenyl ring with no other substitution). Alternatively, the phenolic compound may be substituted at up to three positions in addition to the phenolic hydroxyl group, wherein one, two or three of the aromatic hydrogens of phenol are replaced with an equal number of substituents, each independently selected from a hydroxyl group; a $C_1$-$C_{22}$ alkyl group, preferably a $C_2$-$C_{18}$ alkyl group, more preferably a $C_3$-$C_{12}$ alkyl group, even more preferably a $C_4$-$C_9$ alkyl group, for example, methyl, ethyl, n-propyl, isopropyl, n-butyl, isobutyl, tert-butyl; a $C_1$-$C_{22}$ alkoxy group, preferably a $C_2$-$C_{12}$ alkoxy group, more preferably a $C_3$-$C_6$ alkoxy group, for example, methoxy, ethoxy, and isopropoxy; an aryl group; an arylalkyl group, for example a benzyl group; and a halo group such as chlorine, bromine, fluorine and iodine.

Specific examples of substituted phenolic compounds include, but are not limited to, o-cresol, m-cresol, p-cresol, 2,5-xylenol, 2,3-xylenol, 3,4-xylenol, 3,5-xylenol, 2,3,5-trimethylphenol, isopropylphenol (e.g., 4-isopropylphenol), tert-butylphenol (e.g., 4-tert-butylphenol), amylphenol (e.g., 4-tert-amylphenol), heptylphenol (e.g., 4-heptylphenol), octylphenol (e.g., o-octylphenol, p-octylphenol, etc.), nonylphenol (e.g., 4-(2,4-dimethylheptan-3-yl)phenol), decylphenol, dodecylphenol, diphenylolpropane (bisphenol-A), phenylphenol (e.g., 3-phenylphenol), cumylphenol, mequinol, benzyloxyphenol, guaiacol, ethoxyphenol (e.g., 4-ethoxyphenol), as well as polyhydric phenolic compounds such as resorcinol, pyrogallol, catechol, and p-hydroquinone, including mixtures of two or more of any of the above. Also included are fused ring phenols such as naphthols (e.g., 1-naphthol, 2-naphthol, etc.) and similar compounds.

In preferred embodiments, the terpene phenol resin (A) employed in the inkjet ink is a copolymer formed from phenol and one or more of α-pinene, β-pinene, and limonene.

The terpene phenol resin (A) may be present in the inkjet inks in an amount of at least 0.1 wt. %, preferably at least 0.5 wt. %, preferably at least 1 wt. %, more preferably at least 1.5 wt. %, even more preferably at least 2 wt. %, yet even more preferably at least 2.5 wt. %, and up to 10 wt. %, preferably up to 9 wt. %, preferably up to 8 wt. %/0, preferably up to 7 wt. %, preferably up to 6 wt. %, more preferably up to 5 wt. %, even more preferably up to 4 wt. %, yet even more preferably up to 3 wt. %, based on a total weight of the inkjet ink.

The molecular weight of the terpene phenol resin (A) may vary depending on the monomers utilized, the reaction conditions, among many other factors, but typically terpene phenol resins (A) are used that have a weight average molecular weight of at least 400 g/mol, preferably at least 500 g/mol, more preferably at least 600 g/mol, even more preferably at least 700 g/mol, and up to 3,000 g/mol, preferably up to 2,500 g/mol, more preferably up to 2,000 g/mol, even more preferably up to 1,500 g/mol, yet even more preferably up to 1,000 g/mol.

The hydroxyl value (OHV) is defined as the number of milligrams of potassium hydroxide required to neutralize the acetic acid taken up on acetylation of one gram of a chemical substance that contains free hydroxyl groups. Therefore, the hydroxyl value, or the measure of the relative hydroxyl content of the terpene phenol resin (A), is directly correlated to the content of the phenolic compound(s) within the terpene phenol resin (A), with higher hydroxyl values indicating higher phenolic compound incorporation into the copolymer (and lower terpene incorporation). Hydroxyl values can be determined according to Japanese Industrial Standards JIS K 0070: 1992 "Test methods for acid value, saponification value, ester value, iodine value, hydroxyl value, and unsaponifiable matter of chemical products."

The hydroxyl value of the terpene phenol resin (A) employed in the disclosed inkjet inks may vary, however, typically those having hydroxyl values of at least 10 mgKOH/g, preferably at least 15 mgKOH/g, preferably at least 20 mgKOH/g, preferably at least 22 mgKOH/g, preferably at least 24 mgKOH/g, preferably at least 26 mgKOH/g, preferably at least 28 mgKOH/g, preferably at least 30 mgKOH/g, preferably at least 32 mgKOH/g, preferably at least 34 mgKOH/g, more preferably at least 36 mgKOH/g, even more preferably at least 38 mgKOH/g, yet even more preferably at least 40 mgKOH/g, and up to 150 mgKOH/g, preferably up to 130 mgKOH/g, preferably up to 100 mgKOH/g, preferably up to 90 mgKOH/g, preferably up to 80 mgKOH/g, preferably up to 75 mgKOH/g, preferably up to 70 mgKOH/g, preferably up to 65 mgKOH/g, preferably up to 60 mgKOH/g, more preferably up to 55 mgKOH/g, even more preferably up to 50 mgKOH/g, yet even more preferably up to 45 mgKOH/g. In preferred embodiments, the hydroxyl value (OHV) of the terpene phenol resin (A) employed in the disclosed inkjet inks is from 10 to 75 mgKOH/g.

The terpene phenol resin (A) utilized herein may be categorized based upon its softening point (SP), for example according to a ring-and-ball softening point method. The ring-and-ball softening point is defined as the temperature at which a disk of the sample held within a horizontal ring is forced downward a distance of 1 in. (25.4 mm) under the weight of a steel ball as the sample is heated at a prescribed rate in a glycerol bath (e.g., according to JIS B7410, which is incorporated herein by reference in its entirety). In some embodiments, the terpene phenol resin (A) has a softening point of at least 60° C., preferably at least 80° C., preferably at least 100° C., preferably at least 105° C., more preferably at least 110° C., even more preferably at least 115° C., yet even more preferably at least 120° C., and up to 160° C., preferably up to 155° C., preferably up to 150° C., preferably up to 145° C., preferably up to 140° C., more preferably up to 135° C., even more preferably up to 130° C., yet even more preferably up to 125° C.

Suitable examples of terpene phenol resins (A) include, but are not limited to, YS POLYSTER products such as YS POLYSTER U130 (OHV=25 mgKOH/g), YS POLYSTER U115 (OHV=30 mgKOH/g), YS POLYSTER T160 (OHV=60 mgKOH/g), and YS POLYSTER T145 (OHV=65 mgKOH/g), available from Yasuhara Chemical Co. Ltd., and DERTOPHENE products such as DERTOPHENE T (OHV=20-50 mgKOH/g), DERTOPHENE T115 (OHV=40-60 mgKOH/g), DERTOPHENE T160 (OHV=60 mgKOH/g), available from DRT/Pinova, preferably DERTOPHENE T115.

In addition to the terpene phenol resin (A), the inkjet inks may optionally contain other tackifier or adhesive substances in amounts described above for the terpene phenol resin. Such additional tackifier or adhesive substances may include, but are not limited to,

- phenol resins (i.e. copolymers of phenolic compounds with formaldehyde), for example novolak resins such as PHENOLITE TD-2131 and PHENOLITE TD-2090 available from DIC Corp.;
- terpene resins (i.e. homopolymers or copolymers made solely from terpene monomers), such as those made from polymerization of monocyclic monoterpenes (e.g., limonene) and/or bicyclic monoterpenes (e.g., α-pinene, β-pinene), for example YS RESIN PX1250, YS RESIN PX1150, YS RESIN PX1000, YS RESIN PX800, YS RESIN PX1150N, and YS RESIN PX300N, available from Yasuhara Chemical Co. Ltd. and PICCOLYTE A115, PICCOLYTE A125, PICCOLYTE A135, PICCOLYTE A135 PLUS, and PINOVA RESIN 2495, each available from Pinova;
- rosin resins, including, but not limited to: rosin ester resins, such as e.g., an ester of a rosin composed mainly of an abietic type or pimaric type resin acid that has been reacted with an alcohol(s) such as glycerin, pentaerythritol, ethylene glycol, diethylene glycol, triethylene glycol, methanol, etc., and optionally hydrogenated or partially hydrogenated, with specific mention being made to HARIESTER products available from Harima Chemicals, Inc., STAYBELITE ESTER 10-E and PERMALYN 6110, each available from Eastman, SUPER ESTER A-125, SUPER ESTER A-75, PENSEL D-125, PINECRYSTAL KE-359 available from Arakawa Chemical Industries, Ltd., and FORAL 85, FORAL 105, HERCOLYN products, PEXALYN products, and PENTALYN products available from Pinova; hydrogenated acidic rosins such as FORAL AX and FORAL DX, each available from Pinova; partially hydrogenated acidic rosins such as STAYBELITE RESIN-E, available from Eastman, and STAYBELITE and STAYBELITE A, each available from PINOVA; dimerized rosins such as POLY-PALE partially dimerized rosin available from Eastman; and functionalized rosin resins, for example an ester (e.g., glycerol ester) of a rosin which has been modified with maleic anhydride or a rosin which has been subject to carboxylic acid reduction conditions, with specific mention being made to LEWISOL 28-M and Abitol-E hydroabietyl alcohol, each available from Eastman;
- polyamide resins, for example VERSAMID 725, 744, 756, 759 available from BASF Japan Ltd., TOHMIDE 90, 92, 394-N available from Sanho Chemical Co. Ltd., and SUNMIDE 550, 554, 615A, 638, 640 available from Evonik;
- epoxy resins including sulfonamide-modified epoxy resins for example AD-PRO MTS available from Rit-Chem;

(meth)acrylate and styrene/(meth)acrylate resins for example JONCRYL 63, JONCRYL 67, JONCRYL 586, JONCRYL 611, JONCRYL 682, JONCRYL 693, available from BASF, PARALOID DM-55 and PARALOID B-66, available from Palmer Holland, PARALOID B-72, available from Dow Chemical, USA, and ELVACITE 2013, available from Lucite Inc.;

polyurethane resins, such as those formed from reaction between (i) polyols including, but not limited to, ethylene glycol, propylene glycol, propanediol, butanediol, polyethylene glycol, polypropylene glycol, polytetrahydrofuran diol, 3-methyl-1,5-pentanediol, 1,9-nonanediol, polyester polyols such as polyethylene glycol adipate diol, polyethylene glycol succinate diol, poly(3-methyl-1,5-pentanediol adipate) glycol, poly(3-methyl-1,5-pentanediol terephthalate) glycol, carbonate polyols, and (ii) diisocyanates including, but not limited to, 2,4-toluene diisocyanate, 2,6-toluene diisocyanate, 4,4-diphenylmethane diisocyanate, hexamethylene diisocyanate, and isophorone diisocyanate; for example PERMAX 200, PERMAX 202, and SANCURE 20025F, available from Lubrizol;

polyvinyl butyral resins, for example PIOLOFORM BN 16 and MOWITAL B20H available from Kuraray America, Inc.;

polyhydroxystyrene resins such as poly(p-hydroxy styrene) from DuPont;

vinyl resins, for example UCAR VYHH, VMCH, VMCA, and VAGF, available from Dow Chemical Company, and VINNOL E15/45, H14/36, E15/45M, and E16/40A, available from Wacker Chemie AG, Germany;

sulfonamide modified formaldehyde resins such as p-toluene sulfonamide formaldehyde resin;

cellulose ester resins such as cellulose acetate butyrate (CAB-551-0.01) available from Eastman;

as well as polyesters, sulfonated polyesters, cellulose ethers, cellulose nitrate resins, polymaleic anhydrides, acetal polymers, styrene/butadiene copolymers, melamine formaldehyde resins, sulfonamide-modified melamine formaldehyde resins, ketone-aldehyde resins, and polyketone resins;

and the like, including mixtures thereof.

In some embodiments, the inkjet inks are substantially free of other tackifier or adhesive substances. In preferred embodiments, the terpene phenol resin (A) is the only tackifier or adhesive resin present in the inkjet inks.

(B) Compound

The inkjet inks of the present disclosure also include (B) a compound, which is represented by formula (I)

(I)

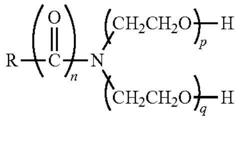

wherein:

R is an alkyl group having 8 to 22 carbon atoms or an alkenyl group having 8 to 22 carbon atoms, n is 0 or 1, p is an integer from 1 to 40, and q is an integer from 1 to 40.

In the compounds (B) of the present disclosure, R may be an alkyl or alkenyl group made up of hydrogen and anywhere from at least 8, preferably at least 10, more preferably at least 12, even more preferably at least 14 carbon atoms, and up to 22, preferably up to 20, more preferably up to 18, even more preferably up to 16 carbon atoms. R may be an alkenyl group (contain site(s) of unsaturation), for example, R may be a mono-, di-, tri-, oligo-, or poly-unsaturated alkenyl group. The site(s) of unsaturation, when present, may be cis-double bonds, trans-double bonds, or a combination. In preferred embodiments, R is an alkyl group (saturated). Whether an alkyl group or an alkenyl group, R may be linear, branched, cyclic (or contain cyclic hydrocarbon groups such as those R groups derived from naphthenic acids). Preferably R is a linear alkyl group or a linear alkenyl group.

In preferred embodiments, the R group of the compound (B) is derivable from fatty acids, including both synthetic fatty acids and naturally occurring fatty acids. For example, amine-based compounds (n=0) may be obtained/obtainable by subjecting a fatty acid(s) to the Nitrile process followed by reduction (e.g., hydrogenation), while amide-based compounds (n=1) may be obtained/obtainable through amidation of a fatty acid(s) or ester variants, both of which are known by those of ordinary skill in the art. Exemplary fatty acid sources that may be used to make the compounds (B) herein include, but are not limited to, caprylic acid, capric acid, lauric acid, myristic acid, palmitic acid, stearic acid, arachidic acid, behenic acid, myristoleic acid, palmitoleic acid, sapienic acid, oleic acid, elaidic acid, vaccenic acid, linoleic acid, linoelaidic acid, α-inolenic acid, arachidonic acid, eicosapentaenoic acid, erucic acid, docosahexaenoic acid, and the like, as well as fatty acid mixtures (natural or synthetic mixtures) such as tall oil fatty acid and its derivatives (TOFA), coconut oil and its derivatives, tallow fatty acid and its derivatives (tallow), naphthenic acids and its derivatives, soya fatty acid and its derivatives (soya), palm oil and its derivatives, palm kernel oil and its derivatives, and the like. Therefore, the compounds (B) of the present disclosure may also exist as a distribution or mixture when derived from mixtures of (naturally occurring) fatty acids.

In the compound (B) of formula (I), p and q may be the same or different. In some embodiments, p and q are independently an integer ranging from 1, preferably from 2, preferably from 3, preferably from 4, preferably from 5, preferably from 6, preferably from 7, more preferably from 8, even more preferably from 9, yet even more preferably from 10, and up to 40, preferably up to 35, preferably up to 30, preferably up to 25, preferably up to 20, preferably up to 18, more preferably up to 16, even more preferably up to 14, yet even more preferably up to 12.

In some embodiments, the compound (B) is present in the inkjet inks in an amount of up to 5 wt. %, for example in an amount of at least 0.01 wt. %, preferably at least 0.05 wt. %, preferably at least 0.1 wt. %, preferably at least 0.5 wt. %, preferably at least 0.6 wt. %, more preferably at least 0.7 wt. %, even more preferably at least 0.8 wt. %, yet even more preferably at least 0.9 wt. %, and up to 5 wt. %0, preferably up to 4 wt. %, preferably up to 3 wt. %, preferably up to 2.5 wt. % c, more preferably up to 2 wt. %, even more preferably up to 1.5 wt. %, yet even more preferably up to 1 wt. %, relative to the total weight of the inkjet inks. In some embodiments, a weight ratio of the terpene phenol resin (A) to the compound (B) ((A):(B)) is at least 1:1, preferably at least 1.5:1, more preferably at least 2:1, even more preferably at least 2.5:1, and up to 5:1, preferably up to 4.5:1, more preferably up to 4:1, even more preferably up to 3.5:1, yet even more preferably up to 3:1.

The compounds (B) of the present disclosure may have a hydrophilic-lipophilic balance (HLB) according to Griffin's method of at least 5, preferably at least 5.1, preferably at least 5.5, preferably at least 6, preferably at least 6.5, more preferably at least 7, even more preferably at least 7.5, yet even more preferably at least 8, and up to 16, preferably up to 15.4, preferably up to 15, preferably up to 14, preferably up to 13, preferably up to 12, more preferably up to 11, even more preferably up to 10, yet even more preferably up to 9.

In embodiments where n is 0 in formula (I), the compound (B) is an amine-based compound of Formula (Ia)

(Ia)

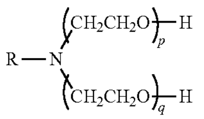

where R, p, and q are as defined previously, preferably p and q are independently an integer ranging from 1, preferably from 2, preferably from 3, preferably from 4, and up to 15, preferably up to 12, preferably up to 8, preferably up to 6, preferably up to 5.

The amine-based compound of formula (Ia) may be derivable or manufactured by ethoxylation of a fatty amine. Exemplary fatty amines that may be ethoxylated herein include, but are not limited to, coco amine, stearyl amine, palmitoleylamine, oleylamine, tallow amine (e.g., Farmin TD, commercially available from Kao), tall oil fatty acid amine, laurylamine, linoleylamine, myristylamine, cetylamine, stearylamine, and soya amine, any of which may be optionally hydrogenated, partially hydrogenated, or non-hydrogenated.

Specific examples of amine-based compounds of formula (Ia) include, but are not limited to, AMIET 102, AMIET 105, AMIET 302, AMIET 308, AMIET 320, AMIET 502, AMIET 505, and AMIET 515, each available from Kao.

In embodiments where n is 1 in formula (I), the compound (B) is an amide-based compound of Formula (Ib)

(Ib)

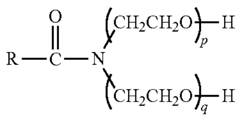

where R, p, and q are as defined previously, preferably p and q are independently an integer ranging from 1 and up to 3, preferably 1 or 2. In preferred embodiments, p and q are the same, preferably both p and q are 1.

The amide-based compound of formula (Ib) may be derivable or manufactured by condensation of fatty acid(s) (e.g., those listed previously) or an ester variant thereof, with a suitable ethoxylated amine. Specific examples of amide-based compounds of formula (Ib) include, but are not limited to, cocamide diethanolamine (DEA), lauramide DEA, linoleamide DEA, myristic amide DEA, palmitic amide DEA, and oleamide DEA, with specific mention being made to AMINON L-02 (lauramide DEA) and AMINON PK-02S (palm kernel amide DEA), each available from Kao.

Continuous, high volume (e.g., 200+ pages) printing operations tend to generate a gradual build-up of static charges, particularly during winter months or other low humidity conditions. Without being bound by theory, it is believed that this build-up of static charges results in an accumulation of solid ink components (such as polymers and colorants) in and around the nozzles of the print head once printing is stopped. As a consequence, print quality suffers once printing recommences. Notably, the ability of inks to perform after static build-up is a separate issue from decap behavior, as inks which otherwise have good decap behavior can still suffer from such static-induced nozzle clogging/plugging.

It has been surprisingly found that the compound (B) of the present disclosure prevents this static-induced nozzle clogging/plugging effect and enables high quality image production in statically charged environments, such as in high volume printing operations involving intermittent downtime (see e.g., Examples 1-3). On the other hand, other types of agents, including both amphoteric surfactants (e.g., amine oxide surfactants, betaine surfactants, imidazole-based amphoteric surfactants) and non-ionic surfactants (e.g., sorbitan ester surfactants), fail in this regard, resulting in inkjet inks that produce poor print quality once printing is resumed (see e.g., Examples 4-6 and 8).

(C) Alkanolamine

The inkjet inks may optionally include a neutralization reagent, preferably in the form of an alkanolamine, which are alkane-based compounds that contain both hydroxyl (—OH) and amino (primary, secondary, or tertiary) groups.

In some embodiments, the alkanolamine (C) has a total of at least 2 carbon atoms, preferably at least 3 carbon atoms, preferably at least 4 carbon atoms, and up to 8 carbon atoms, preferably up to 7 carbon atoms, more preferably up to 6 carbon atoms, more preferably up to 5 carbon atoms.

In preferred embodiments, the alkanolamine (C) used in the inkjet inks herein has the following general formula II:

(II)

wherein X, Y and Z are independently selected from the group consisting of hydrogen;

a $C_1$-$C_5$ alkyl group, preferably a $C_2$-$C_3$ alkyl group; and an alkanol group, preferably a $C_2$-$C_5$ alkanol group, more preferably a $C_3$-$C_4$ alkanol group;

wherein at least one of X, Y and Z is an alkanol group (an alkyl substituent that bears at least one hydroxyl group).

In some embodiments, one of X, Y, and Z is an alkanol group. In some embodiments, two of X, Y, and Z are an alkanol group. In some embodiments, X, Y, and Z are all alkanol groups.

With respect to the one or more alkanol groups, the alkyl chain thereof may contain branching. Alternatively, the alkyl chain of the alkanol group may be linear (contains no alkyl branching). In preferred embodiments, the alkanol group(s) is based on a linear alkyl chain. Further, the hydroxyl bearing carbon of the alkanol group may be a primary, secondary, or tertiary carbon, preferably the hydroxyl bearing carbon is a primary or secondary carbon.

The alkanolamine (C) may contain a primary amino group (i.e., two of X, Y, and Z are hydrogen), a secondary amino group (i.e., one of X, Y, and Z are hydrogen), or a tertiary amino group (i.e., X, Y, and Z are all non-hydrogen). When an alkanolamine (C) is employed that contains a secondary amino group, the two non-hydrogen substituents may be the same or different alkanol groups, preferably the same alkanol group, for example as is the case in diethanolamine.

When an alkanolamine (C) is employed that contains a tertiary amino group, the three non-hydrogen substituents may be the same or different alkanol groups, preferably the same alkanol group, for example as is the case in triethanolamine.

Suitable examples of the alkanolamine (C) include, but are not limited to, ethanolamine, N-methylethanolamine, N,N-dimethylethanolamine, N-ethylethanolamine, N-propylethanolamine, N-isopropylethanolamine, N,N-diisopropylethanolamine, N-butylethanolamine, diethanolamine, N-methyldiethanolamine, N-ethyldiethanolamine, triethanolamine, propanolamine (3-Amino-1-propanol), N-methylpropanolamine, N,N-dimethylpropanolamine, dipropanolamine, tripropanolamine, isopropanolamine, N,N-dimethylisopropanolamine, diisopropanolamine, triisopropanolamine, 2-amino-2-methyl-1-propanol, 2-amino-2-ethyl-1,3-propanediol, 4-amino-1-butanol, 2-amino-1-butanol, sec-butanolamine, and di-sec-butanolamine. In preferred embodiments, the alkanolamine (C) is at least one selected from the group consisting of ethanolamine, diethanolamine, triethanolamine, propanolamine (3-Amino-1-propanol), and isopropanolamine.

In some embodiments, the alkanolamine (C) is present in the inkjet inks in amounts of at least 0.1 wt. %, preferably at least 0.2 wt. %, preferably at least 0.3 wt. %, preferably at least 0.4 wt. %, preferably at least 0.5 wt. %, preferably at least 0.6 wt. %, preferably at least 0.7 wt. %, more preferably at least 0.8 wt. %, even more preferably at least 0.9 wt. %, yet even more preferably at least 1 wt. %, and up to 10 wt. %, preferably up to 8 wt. %, preferably up to 6 wt. %, preferably up to 5 wt. %, preferably up to 4 wt. %, more preferably up to 3 wt. %, even more preferably up to 2 wt. %, yet even more preferably up to 1.5 wt. %, relative to the total weight of the inkjet inks. In some embodiments, the weight ratio of the terpene phenol resin (A) to the alkanolamine (C) ((A):(C)) is at least 0.5:1, preferably at least 0.7:1, preferably at least 1:1, more preferably at least 2:1, even more preferably at least 2.5:1, yet even more preferably at least 3:1, and up to 15:1, preferably up to 10:1, preferably up to 9:1, preferably up to 8:1, preferably up to 7:1, more preferably up to 6:1, even more preferably up to 5:1, yet even more preferably up to 4:1.

Solvent System

In many printing processes that utilize solvent-based inks, and particularly in thermal inkjet printing, the selection of an appropriate solvent system may impact the reliability of the printing process, the properties/appearance of the printed ink product, and the overall printing process efficiency. For example in thermal inkjet printing, the choice of solvent system may 1) aid bubble formation during the jetting process resulting in reliable ink jetting, 2) affect the stability/volatility of the inkjet inks by changing the interaction dynamics between the solvent(s) and the various inkjet ink components and thus the decap behavior, kogation, and/or drop trajectory, 3) impact the adhesion, rub and scratch resistance, and optical density properties of the printed image through the interactive forces between the solvent system and the other inkjet ink components even though the solvent(s) may no longer be present, or may be present in lesser amounts, after drying, and/or 4) influence the drying time after application or the equipment needed to dry the applied ink.

In light of the above, particular preference is given to inkjet inks which further include (D) ethanol. The inclusion of ethanol (D) may aid solvation of the inkjet ink components and provide the inkjet inks with acceptable volatility for the purposes of dry times. It is preferred that ethanol (D) constitutes a majority of the solvent system used in the inkjet inks herein. In some embodiments, ethanol (D) is present in the inkjet inks in an amount of at least 30 wt. %, preferably at least 40 wt. %, more preferably at least 50 wt. %, even more preferably at least 60 wt. %, yet even more preferably at least 65 wt. %, and up to 85 wt. %, preferably up to 80 wt. %, more preferably up to 75 wt. %, even more preferably up to 70 wt. %, yet even more preferably up to 69 wt. %, based on a total weight of the inkjet inks.

The inkjet inks are also preferably formulated to include (E) 1-propanol. 1-propanol (E) may have a high affinity with the polymeric ingredients (e.g., terpene phenol resin (A)) while the hydrophobicity of the n-propyl chain may still prevent formation of too many hydrogen bonds so that a fast dry may be realized. In some embodiments, 1-propanol (E) is present in the inkjet inks in an amount of at least 10 wt. %, preferably at least 15 wt. %, more preferably at least 18 wt. %, even more preferably at least 20 wt. %, and up to 40 wt. %, preferably up to 35 wt. %, more preferably up to 30 wt. %, even more preferably up to 25 wt. %, based on a total weight of the inkjet inks.

In preferred embodiments, the inkjet inks include a combination of (D) ethanol and (E) 1-propanol. Such a blend may incorporate advantageous characteristics from both ethanol (D) and 1-propanol (E) and thus may augment the extended decap time and the fast dry time properties of the inkjet inks. Taken together, a combined weight of ethanol (D) and 1-propanol (E) ((D)+(E)) in the inkjet ink is typically at least 50 wt. %, preferably at least 55 wt. %, preferably at least 60 wt. %, preferably at least 65 wt. %, more preferably at least 70 wt. %, even more preferably at least 75 wt. %, yet even more preferably at least 80 wt. %, and up to 95 wt. %, preferably up to 92 wt. %, more preferably up to 90 wt. %, even more preferably up to 89 wt. %, yet even more preferably up to 88 wt. %, based on a total weight of the inkjet ink. In preferred embodiments, a weight ratio of ethanol (D) to 1-propanol (E) ((D):(E)) is at least 1.5:1, preferably at least 2:1, preferably at least 2.5:1, more preferably at least 3:1, even more preferably at least 3.3:1, and up to 8:1, preferably up to 7:1, more preferably up to 6:1, even more preferably up to 5:1, yet even more preferably up to 4:1.

In preferred embodiments, the inkjet inks of the present disclosure are substantially non-aqueous, meaning that no water is added to the inkjet inks other than what may be incidental amounts of moisture derived from ambient conditions. In such cases, the inkjet inks may have less than 1 wt. %, preferably less than 0.5 wt. %, preferably less than 0.1 wt. % preferably less than 0.05 wt. %, preferably less than 0.01 wt. % of water, more preferably 0 wt. %, based on the total weight of inkjet inks.

In addition to ethanol (D) and 1-propanol (E), the inkjet inks may optionally contain one or more additional organic solvents or humectants (such as those humectants described in US 2015/0291816A1, which is incorporated herein by reference in its entirety. When present, the additional organic solvents (or humectants) may be included in amounts of up to 20 wt. %, preferably up to 15 wt. %, preferably up to 10 wt. %, preferably up to 5 wt. ° %, more preferably up to 4 wt. %, even more preferably up to 2 wt. %, yet even more preferably up to 1 wt. %. Exemplary additional organic solvents or humectants include, but are not limited to:

- lower alcohols containing from 1 to 8 carbon atoms (other than ethanol and 1-propanol), such as methanol, 1-butanol, 2-butanol, 2-propanol;
- glycol ethers such as ethylene glycol monomethyl ether, ethylene glycol monoethyl ether, ethylene glycol monobutyl ether, diethylene glycol monomethyl ether, diethylene glycol monoethyl ether, diethylene glycol mono-n-propyl ether, ethylene glycol mono-isopropyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, propylene glycol monomethyl ether, propylene glycol monoethyl ether, propylene glycol mono-t-butyl ether, propylene glycol mono-n-propyl ether, propylene glycol mono-isopropyl ether, propylene glycol mono-n-butyl ether, dipropylene glycol mono-n-butyl ether, dipropylene glycol monomethyl ether, dipropylene glycol monoethyl ether, dipropylene glycol mono-n-propyl ether, and dipropylene glycol mono-iso-propyl ether;

ethers (non-glycol ethers), for example ethers containing 4 to 8 carbon atoms such as diethyl ether, dipropyl ether, methyl tert-butyl ether, dibutyl ether, dioxane, and tetrahydrofuran;

ketones, for example ketones containing 3 to 6 carbon atoms, including acetone, methyl ethyl ketone, 3-pentanone, cyclohexanone, and diacetone alcohol;

esters, including those having 3 to 8 carbon atoms, for example methyl acetate, ethyl acetate, n-butyl acetate, methyl lactate, ethyl lactate, butyl lactate, methoxyethyl acetate, ethoxyethyl acetate, methoxypropyl acetate, ethoxypropyl acetate;

and the like, as well as mixtures of two or more thereof.

In preferred embodiments, ethanol (D) and 1-propanol (E) are the only lower alcohols having 1 to 8 carbon atoms present in the inkjet inks, that is, the inkjet inks are substantially free of all lower alcohols (having 1 to 8 carbon atoms) other than ethanol (D) and 1-propanol (E). In particular, the inkjet inks are preferably substantially free of 2-propanol and 1-butanol. In some embodiments, the inkjet inks are substantially free of ketone solvents, in particular, the inkjet inks are preferably substantially free of methyl ethyl ketone and acetone. In some embodiments, the inkjet inks are substantially free of additional organic solvents, that is, organic solvents other than ethanol (D) and 1-propanol (E). In preferred embodiments, the inkjet inks are substantially free of humectants, such as those described in US 2015/0291816A1, incorporated herein by reference in its entirety.

(F) Silicone Acrylate Copolymer

The inkjet ink may optionally include (F) a silicone acrylate copolymer as a surfactant. The incorporation of such a surfactant may provide the inkjet inks advantageous nozzle discharge properties, as well as leveling and substrate wetting properties, thus contributing to improved overall print quality. By use of a copolymer made of distinct materials, such as (meth)acrylate and silicone portions, a single ingredient can supply multiple beneficial characteristics to the inkjet inks. For example, the (meth)acrylate portion may provide advantageous leveling and substrate wetting, while the silicone portion may provide desirable anti-crater properties.

The silicone acrylate copolymers (F) optionally used in the inkjet ink may be obtained according to methods known to those of ordinary skill in the art, for example, by polymerization (e.g., free-radical polymerization) or grafting of a polyorganosiloxane macromer comprising at least one polymerizable group (e.g., on one of the ends of the polyorganosiloxane chain, on both ends of the polyorganosiloxane chain, or on the silicone backbone) and a (meth) acrylate monomer, as described for example, in U.S. Pat. No. 5,219,560-incorporated herein by reference in its entirety. Preferably, the silicone acrylate copolymer (F) is a polysiloxane (polyorganosiloxane) modified poly(meth) acrylate, that is, a copolymer composed of a poly(meth) acrylate backbone and a polyorganosiloxane grafted to the acrylic backbone (i.e., a graft copolymer). In preferred embodiments, a major proportion of the silicone acrylate copolymer (F) is poly(meth)acrylate. In preferred embodiments, the silicone acrylate copolymer (F) has a polyorganosiloxane content of at least 1 wt. %, preferably at least 2 wt. %, more preferably at least 3 wt. %, even more preferably at least 4 wt. %, and up to 20 wt. %, preferably up to 15 wt. %, more preferably up to 10 wt. %, even more preferably up to 8 wt. %, based on a total weight of the silicone acrylate copolymer (F).

The polyorganosiloxane macromer may be based on any organosilicon polymer or oligomer of linear structure, of variable molecular weight, which can be formed from polymerization and/or polycondensation of suitably functionalized silanes, and which has a polysiloxane backbone structure (silicon atoms are linked together via oxygen atoms, —Si—O—Si—), with alkyl, aryl, and/or arylalkyl groups directly bonded to the (tetravalent) silicon atoms. For example, the polyorganosiloxane backbone may be a polydimethylsiloxane backbone (where each silicon atom in the backbone is directly bonded to two methyl groups), a poly(dimethylsiloxane-co-methylphenylsiloxane) backbone, a poly(dimethylsiloxane-co-diphenylsiloxane) backbone, or a poly(dimethylsiloxane-co-methylalkylsiloxane) backbone.

The polyorganosiloxane macromer may be modified to include at least one polymerizable group (e.g., (meth)acrylate-containing group), preferably the polyorganosiloxane macromer may be end group modified to include a polymerizable group on at least one of the ends of the polysiloxane chain. In some embodiments, the polyorganosiloxane macromer has a polymerizable group on both ends of the polysiloxane chain. In some embodiments, the polyorganosiloxane macromer has a polymerizable group on one end of the polysiloxane chain and a non-polymerizable end group (e.g., trimethyl silane, triphenyl silane, phenyldimethylsilane, etc.) on the other end of the chain. In some embodiments, the polymerizable group may be a styrenyl-type group ($CH_2$═C($R_1$)-arylene-) or a (meth)acrylate group, in particular a group represented by $CH_2$═$CR_1$—CO—O—$R_2$—, wherein $R_1$ is a hydrogen or a methyl group and $R_2$ is a divalent, linear or branched hydrocarbon group having 1 to 10 carbon atoms, preferably 2 to 8 carbon atoms, preferably 3 to 6 carbon atoms, and optionally containing ether bonds therein (e.g., one, two, three, four, etc. ether bonds), and optionally containing hydroxyl group substituent(s) (e.g., as in the case of ring-opened products resulting from reaction between an epoxide and (meth)acrylic acid). In preferred embodiments, $R_2$ is $—(CH_2)_n—$ with n=1 to 10, $—CH_2CH(CH_3)CH_2—$, $—CH_2CH_2OCH_2CH_2—$, $—CH_2CH_2OCH_2CH_2CH(CH_3)CH_2—$, $—CH_2CH_2OCH_2CH_2OCH_2CH_2CH_2—$, and $—CH_2CH(OH)CH_2OCH_2CH_2CH_2—$.

The silicone acrylate copolymer (F) may be made by polymerizing the polyorganosiloxane macromer in the presence of a wide variety of (meth)acrylate monomers, including both (meth)acrylic acid (acrylic acid and methacrylic acid) and ester variants, which may be aryl or alkyl (meth) acrylate esters. The poly(meth)acrylate backbone may be formed from one type of monomer, or alternatively from two or more types of (meth)acrylate monomers. In preferred embodiments, the (meth)acrylate monomers are (meth)acrylate alkyl esters, which may be chosen from linear, branched or cyclic alkyl esters, for example $C_1$ to $C_{22}$ alkyl esters, preferably $C_2$ to $C_{20}$ alkyl esters, preferably $C_3$ to $C_{18}$ alkyl esters of acrylates and methacrylates. In some embodiments, the alkyl group is chosen from methyl, ethyl, butyl, stearyl, isostearyl, and 2-ethylhexyl, as well as mixtures thereof. Suitable (meth)acrylate monomers include, but are not limited to, methyl acrylate, ethyl acrylate, isopropyl acrylate, n-butyl acrylate, tert-butyl acrylate, cyclohexyl acrylate, 2-ethylhexyl acrylate, tridecyl acrylate, stearyl acrylate, isostearyl acrylate, behenyl acrylate, methyl methacrylate, ethyl methacrylate, isopropyl methacrylate, n-butyl methacrylate, tert-butyl methacrylate, cyclohexyl methacrylate, 2-ethylhexyl methacrylate, tridecyl methacrylate, stearyl methacrylate, isostearyl methacrylate, behenyl methacrylate, and combinations thereof.

In some embodiments, the silicone acrylate copolymer (F) has a weight average molecular weight of from 3,000 g/mol, preferably from 4,000 g/mol, more preferably from 5,000 g/mol, even more preferably from 8,000 g/mol, yet even more preferably from 10,000 g/mol, and up to 500,000 g/mol, preferably up to 400,000 g/mol, more preferably up to 300,000 g/mol, even more preferably up to 200,000 g/mol, yet even more preferably up to 100,000 g/mol.

When employed in the inkjet inks, the silicone acrylate copolymer (F) may be used as is or, alternatively, may be dispersed or dissolved in an organic solvent such as lower alcohols containing from 2 to 8 carbon atoms (e.g., ethanol, 1-proponol, 2-propanol, 1-butanol, etc.), ester solvents (e.g., methoxyethyl acetate, ethoxyethyl acetate, methoxypropyl acetate, ethoxypropyl acetate, butyl acetate, etc.) or oils (e.g., cyclopentasiloxane). In some embodiments, when employed as a dispersion or solution, the solvent is an ester solvent, most preferably methoxypropyl acetate. In some embodiments, the solids content of the dispersion or solution is at least 30 wt. %, preferably at least 40 wt. %, preferably at least 50 wt. %, and up to 60 wt. %, preferably up to 55 wt. %, preferably up to 52 wt. %, relative to a total weight of the dispersion/solution.

Representative examples of silicone acrylate copolymers (F) that are commercially available and which may be used in the inkjet inks described herein include, but are not limited to, KP-541, KP-543, KP-545, KP-550, KP-575 (acrylic polymers grafted with polydimethylsiloxane side chains, available from Shin-Etsu Chemical Co., Ltd.), BYK-3550 (available from BYK Japan K.K.), including mixtures thereof. In preferred embodiments, the silicone acrylate copolymer (F) is BYK-3550.

The silicone acrylate copolymer (F) may be employed in amounts of at least 0.01 wt. %, preferably at least 0.05 wt. %, more preferably at least 0.1 wt. %, even more preferably at least 0.5 wt. %, yet even more preferably at least 1 wt. %, and up to 5 wt. %, preferably up to 4 wt. %, more preferably up to 3 wt. %, even more preferably up to 2.5 wt. %, yet even more preferably up to 2 wt. %, preferably up to 1.5 wt. %, based on a total weight of the inkjet ink.

(G) Colorant

It is to be readily appreciated by those of ordinary skill in the art that colorants may be optionally included in the inkjet inks to provide colored inks that may be used for a variety of printing purposes and the inkjet inks are not limited to any particular color. Any colorant can be employed in the inkjet inks to provide the desired color, including dyes, pigments, mixtures thereof, and the like, provided that the colorant can be dissolved or dispersed within the inkjet inks. Suitable colors include, for example, cyan, magenta, yellow, and key (black) ("CMYK"), white, orange, green, light cyan, light magenta, violet, and the like, including both spot colors and process colors. In general, the colorants may be employed in amounts of at least 0.1 wt. %, preferably at least 0.5 wt. %, more preferably at least 1 wt. %, even more preferably at least 2 wt. %, yet even more preferably at least 3 wt. %, and up to 20 wt. %, preferably up to 15 wt. %, more preferably up to 10 wt. %, even more preferably up to 8 wt. %, yet even more preferably up to 7 wt. 10 relative to the total weight of the inkjet inks.

Dye

The inkjet inks can be formulated with various dyes, with particular preference given to metal complex dyes, one specific and non-limiting example of which is VALIFAST BLACK 3870, which is a black azo-metal complex dye available from Orient Chemical Industries Co., Ltd.

Pigment

The inkjet inks can be formulated with various inorganic pigments and/or organic pigments. In addition to providing color to the inkjet inks, such pigments may be capable of improving the light resistance, the weather resistance, etc., of the printed images.

(H) Additives

In addition to the components already mentioned, the inkjet inks may also be formulated with various additives (H) to improve various ink characteristics and performance. For example, the inkjet inks may optionally contain one or more of an anti-kogation agent, additional surfactants (other than compound (B) and optionally the silicon acrylate copolymer (F)), a stabilizer, and a security taggant.

In particular, the inkjet inks may optionally contain additional surfactants (in addition to the compounds (B) of the present disclosure and optionally the silicon acrylate copolymer (F)), in amounts described above for the compound (B). Such additional surfactants may include, but are not limited to

- cationic surfactants, including but not limited to: protonated fatty amines such as protonated salts of $C_6$-$C_{22}$ alkyl monoamines, $C_6$-$C_{22}$ alkyl (poly)alkylene polyamines, and alkoxylated fatty amines; protonated fatty alkyl amidoamines such as protonated forms of stearamidopropyldimethylamine, stearamidopropyldiethylamine, and palmitamidoethyldimethylamine; and quaternary ammonium compounds such as those formed from alkylation of a tertiary fatty amine, an alkoxylated (tertiary) amine, or an aprotic nitrogenous heteroarene (optionally substituted) having at least one aromatic nitrogen atom with a reactive lone pair of electrons, with specific mention being made to a tri-fatty alkyl ammonium compounds (e.g., trioctyl methyl ammonium chloride), fatty trimethyl ammonium compounds, difatty dimethyl ammonium compounds, fatty benzyl dimethyl ammonium compounds, and N-fatty alkyl pyridinium or a quinolinium compounds;
- anionic surfactants including, but not limited to: sulfates, such as alkyl sulfates, alkyl-ester-sulfates, alkyl ether sulfates, alkyl-alkoxy-ester-sulfate, sulfated alkanolamides, and glyceride sulfates; sulfonates such as alkyl sulfonates, fatty alkyl-benzene sulfonates, lower alkylbenzene sulfonates, alpha olefin sulfonates, and lignosulfonates; phosphates such as alkyl aryl ether phosphates, alkyl ether phosphates, and phosphates of fatty alcohols or polyoxyalkylene ethers of fatty alcohols;
- non-ionic surfactants including, but not limited to: amides or monoalkanolamides of fatty acids, including alkoxylated monoalkanolamides of fatty acids such as coconut fatty acid monoethanolamide and coconut fatty acid monoethanolamide reacted with 2-20 moles of ethylene oxide; fatty esters such as ethoxylated and/or propoxylated fatty acids (e.g., castor oil with 2 to 40 moles of ethylene oxide), alkoxylated glycerides (e.g., PEG-24 glyceryl monostearate), glycol esters and derivatives, monoglycerides, polyglyceryl esters, esters of polyalcohols, and sorbitan/sorbitol esters like sorbitan monolaurate (e.g., EMASOL L-10V, available from Kao); ethers, such as alkoxylated $C_1$-$C_{22}$ alcohols including alkoxylated fatty alcohols (e.g., ethoxylated cetyl stearyl alcohol, ethoxylated lauryl alcohol), alkoxylated polysiloxanes, ethylene oxide/propylene oxide copolymers, alkoxylated alkylphenols, and alkyl polyglycosides (APGs) such as those made from reaction between fatty alcohols and glucose; modified polysiloxanes; alkyl modified polyoxyalkyleneamines; alkyl modified propoxylated diamines; and alkyl ether amines; and amphoteric surfactants including, but not limited to: fatty alkyl betaines such as lauryl betaine (e.g., AMPHITOL 24B, available from Kao); fatty alkyl amido betaines such as fatty amidopropyl dimethylamino betaine; fatty alkyl sultaines such as fatty dimethyl hydroxysultaine; fatty alkyl amido sultaines such as fatty amido propyl dimethylamino hydroxysultaine; amine oxides, such as N-cocoamidopropyl dimethyl amine oxide, dimethyl fatty alkyl amine oxides such as dimethyl coco amine oxide, lauryldimethyl amine oxide (e.g., AMPHITOL 20N, available from Kao); and imidazole-based amphoteric surfactants (e.g., ELEC AC, available from Kao).

In preferred embodiments, the inkjet inks are substantially free of additional surfactants, preferably compound (B) is the only surfactant present.

Methods of Making

Embodiments of the inkjet inks described herein may be prepared by any suitable technique known to those of ordinary skill in the art, for example by combining components (A) a terpene phenol resin and (B) a compound of the present disclosure with any chosen organic solvents (e.g., (D) ethanol and/or (E) 1-propanol) and any desired optional ingredients (e.g., (C) an alkanolamine, (F) a silicone acrylate copolymer, (G) a colorant, and/or (H) an additive), in any order and stirring, agitating, and/or homogenizing at a temperature between 20 and 100° C. until a homogeneous solution is formed.

In one example, the inkjet ink may be made by first combining the terpene phenol resin (A) with 1-propanol (E)) in a vessel and stirring for example for at least 10 minutes, preferably at least 15 minutes, preferably at least 20 minutes, preferably at least 25 minutes, preferably at least 30 minutes, preferably at least 35 minutes, preferably at least 40 minutes, preferably at least 45 minutes. Then, ethanol (D), the alkanolamine (C), and the silicone acrylate copolymer (F), along with any desired additive (H) may be added to the mixture with continued mixing for at least 5 minutes, preferably at least 10 minutes, preferably at least 15 minutes, preferably at least 20 minutes, preferably at least 25 minutes, preferably at least 30 minutes or otherwise until complete dissolution. The colorant (G) may then be added with continued mixing for at least 10 minutes, preferably at least 15 minutes, preferably at least 20 minutes, preferably at least 25 minutes, preferably at least 30 minutes, preferably at least 35 minutes, preferably at least 40 minutes, preferably at least 45 minutes. Finally, the compound (B) may then be added slowly while mixing for at least 5 minutes, preferably at least 10 minutes, preferably at least 15 minutes, preferably at least 20 minutes, preferably at least 25 minutes, preferably at least 30 minutes. The resulting inkjet ink may then be optionally filtered (e.g., through a 1.0 μm filter) and placed into a printing cartridge, such as HP45SI made by Hewlett Packard.

Properties

Among other advantages, the inkjet inks disclosed herein possess a superior combination of extended decap times and quick dry times after being applied, and prevent clogged/plugged nozzles caused by a buildup of static charges during high-volume printing operations.

Dry times may be measured by applying the inkjet inks in the form of a solid block image (e.g., 1 cm*10 cm) onto a substrate, waiting for the inkjet inks to dry under ambient conditions (in air at room temperature, about 23° C., without applied heat), for a certain period of time, for example at 5, 10, 15, 20, 25, or 30 seconds, and then performing an abrasion test by finger to test if color transfers from the printed image to the finger at the tested time interval. If color transfer occurs, then the tested dry time is not satisfactory to achieve complete drying (rated "No Good" or "NG"). If no color transfer occurs, then the tested dry time is satisfactory to achieve complete drying (rated "Good" or "G"). Any inkjet inks requiring dry times of over 30 seconds to achieve a "Good" rating are considered unacceptable (slow drying), while those which achieve a "Good" rating with dry times of 30 seconds or less are deemed acceptable (or quick). In preferred embodiments, the inkjet inks of the present disclosure have acceptable (quick) dry times, and dry within 30 seconds or less, preferably 25 seconds or less after being applied.

The inkjet inks disclosed herein also possess extended decap times as measured by printing a narrow line picture (1 mm*1 cm, narrow lines, Monochrome bitmap), exposing the inkjet ink to air (decapping the ink cartridge) for a particular time, reprinting the same narrow line picture, and comparing the reprinted image after decapping to the original image to determine if loss of nozzles occurred. If there are no missing nozzles at the tested time interval, then the inkjet inks are given a "Good" ("G") decap rating at that time interval. Otherwise, if missing nozzles exist, then the inkjet ink is classified as "No Good" ("NG") at that time interval. Inkjet inks which maintain a "Good" decap rating when decapped for 10 minutes or longer are considered to have acceptable (extended or prolonged) decap times. In preferred embodiments, the inkjet inks of the present disclosure have a decap time, i.e., maintain a "Good" decap classification when decapped (i.e., exposed to air), for 5 minutes or longer, preferably 10 minutes or longer, preferably 30 minutes or longer, more preferably 1 hour or longer, even more preferably 2 hours or longer, yet even more preferably 4 hours or longer. In other words, the inkjet inks are capable of forming a printed image that is substantially identical to the original printed image even when exposed to air (i.e., decapped) for 5 minutes or longer, preferably 10 minutes or longer, preferably 30 minutes or longer, more preferably 1 hour or longer, even more preferably 2 hours or longer, yet even more preferably 4 hours or longer. Of course it should be recognized that an inkjet ink that satisfies the condition of maintaining a "Good" decap classification when decapped for a particular time (e.g., 5 minutes) by definition also achieves a "Good" decap classification for all times leading up to that particular time interval (e.g., all times leading up to 5 minutes) as well.

To test the inks for their reliability during high-volume printing operations (i.e., the inkjet inks ability to minimize static-induced nozzle clogging/plugging effects), the inkjet inks may be used to print a high-volume number of pages (e.g., at least 200 pages, preferably at least 300 pages, preferably at least 400 pages, preferably at least 500 pages) of a printing image (e.g., see the UPC12 barcode image, 2D Data Matrix, and Purge Bar shown in FIG. 1 and described in the Examples) in continuous fashion. The continuous printing run is then interrupted for a certain period of time, for example a downtime of 10 seconds, 30 seconds, 1 minute, 2 minutes, 5 minutes, 10 minutes, etc. and then after a particular downtime, the same printing image is reprinted. The reprinted printing image produced after the tested downtime (e.g., print #501) is then visually compared to the first printing image (print #1) and the final printed image of the continuous printing run (e.g., print #500) to determine if loss of nozzles occurred during the tested downtime. If there are no missing nozzles in the reprinted printing image (e.g., print #501), then the inkjet inks are given a "Good" ("G") rating, which indicates that the inkjet inks prevent static-induced nozzle clogging/plugging. Otherwise, if missing nozzles exist, then the inkjet ink is classified as "No Good" ("NG"), meaning that the inkjet inks suffer from static-induced nozzle clogging/plugging effects to an unacceptable degree, and thus have poor reliability during high-volume print jobs. In preferred embodiments, the inkjet inks of the present disclosure achieve a "Good" rating during such high-volume printing tests.

Printed Article

The inkjet inks can be printed on various substrates including three dimensional parts as well as flat sheets or webs that are supplied in roll form, for the manufacture of a wide variety of printed articles. Additionally, the substrates may possess various surface types, for example, a flat surface, a structured surface, such as grained surfaces, and a three-dimensional surface, such as curved and/or complex surfaces, which are notoriously difficult substrates owing to the long distance that the ink must travel to reach all parts of the curved and/or complex surface. Such printed articles may be suitable in the graphic arts, textiles, packaging (e.g., food packaging, pharmaceutical packaging, etc.), lottery, business forms and publishing industries, examples of which include a tag or label, a lottery ticket, a publication, packaging (e.g., flexible packaging), a folding carton, a rigid container (e.g., a plastic cup or tub, glass containers, metal cans, bottles, jars, and tubes), a point-of-sale display, and the like.

The inkjet inks may be printed on porous or penetrable substrates, examples of which include, but are not limited to, non-coated paper, wood, membranes, and fabrics (including, for example, but not limited to, woven fabric, non-woven fabric, and foil-laminated fabric).

The inkjet inks may also be printed on non-porous or non-penetrable substrates, for example, various plastics, glass, metals (e.g., steel, aluminum, etc.), and/or non-penetration papers (e.g., coated papers). These may include, but are not limited to, molded plastic parts as well a flat sheets or rolls of plastic films. Examples include those containing polyesters such as polyethylene terephthalate (PET), biaxially oriented polystyrene (OPS), polyolefins such as polyethylene (PE), polypropylene (PP), and oriented polypropylene (OPP), polylactic acid (PLA), nylon and oriented nylon, polyvinyl chloride (PVC), cellulose triacetate (TAC), polycarbonate, acrylonitrile butadiene styrene (ABS), polyacetal, polyvinyl alcohol (PVA), and the like. In preferred embodiments, the substrate is a PET film, one example of which is U292W made by Teijin.

Method of Forming a Printed Image

With inkjet printing, a desired printed image is formed when a precise pattern of dots is ejected from a drop-generating device, known as a printhead, onto a print medium. The printhead has an array of precisely formed nozzles located on a nozzle plate and attached to an inkjet printhead substrate. The inkjet printhead substrate incorporates an array of firing chambers that receive inkjet ink through fluid communication with one or more ink reservoirs. Each firing chamber has a resistor element, known as a firing resistor, located opposite the nozzle so that the inkjet ink collects between the firing resistor and the nozzle. Each resistor element is typically a pad of a resistive material and measures for example about 35 μm×35 μm. The printhead is held and protected by an outer packaging referred to as a print cartridge or an inkjet pen. Upon energizing of a particular resistor element, a droplet of inkjet ink is expelled through the nozzle toward the print medium. The firing of ink droplets is typically under the control of a microprocessor, the signals of which are conveyed by electrical traces to the resistor elements, forming alphanumeric and other image patterns on the print medium. Since the nozzles are small, typically 10 μm to 40 μm in diameter, inks that minimize clogging are desired. In particular, since thermal inkjet (TIJ) is an open atmosphere print head design (the nozzle orifices are open to atmosphere and there is no valve seal at the orifice to allow ink pressurization), TIJ printing has historically suffered from poor performance during intermittent printing, where decap time (print idle time) causes premature drying of ink in and around the nozzles.

The present disclosure provides a method of forming a printed image by applying the inkjet ink, in one or more of its embodiments, onto a surface of a substrate by a thermal inkjet printhead and allowing the inkjet ink to dry. Use of the inkjet inks described herein overcomes the competing problems of short decap time (rate of solvent loss is too fast) and slow drying times (rate of solvent loss is too slow) commonly associated with thermal inkjet processes, while still producing high quality prints.

Any drop on demand printhead known to those of ordinary skill in the art of inkjet printing can be used as printing units in the present method, including continuous printheads, thermal printheads, electrostatic printheads, and acoustic printheads, preferably a thermal printhead (having a thermal transducer) is used. Typical parameters, such as, for example, printing resolution, printing speed, printhead pulse warming temperature, driving voltage and pulse length, can be adjusted according to the specifications of the printhead. Printheads which are generally suitable for usage in the methods herein have a droplet size in the range of 2 to 80 pL and a droplet frequency in the range of 10 to 100 kHz, and high quality prints may be obtained for example by setting the driving voltage to 8.0 to 9.5 Volts, the print speed up to 300 feet/minute, the pulse warming temperature to 25 to 45° C., and the pulse length to 0.7-2.5 microseconds, although values above or below these described may also be used and still obtain satisfactory prints. One non-limiting printhead example suitable for use in the disclosed methods is HP45SI made by Hewlett Packard.

After application, the inkjet ink is dried. In preferred embodiments, drying is achieved by allowing the applied inkjet ink to dry under ambient conditions (in air, at about 23° C.) for seconds or less, preferably 25 seconds or less, more preferably 20 seconds or less, even more preferably 15 seconds or less.

While external heat may be applied to dry the applied inkjet inks, in preferred embodiments, external heat is not applied to facilitate drying or to increase drying speeds. For example, a heater is preferably not employed for drying the inkjet ink after application. Furthermore, the methods of the present disclosure do not require energy curing (e.g., UV or electron beam curing). Once the applied ink is deemed dry, further coatings of inkjet ink may be applied, or any processing steps known to those of ordinary skill in the art may be performed as desired.

It should also be recognized that substrate surface treatments such as corona treatment, atmospheric plasma treatment, and flame treatment may optionally be employed in the methods herein prior to application of the inkjet inks to improve printed article characteristics, for example ink adhesion. The parameters of such substrate surface treatments may be varied greatly depending on the substrate material to be printed, the specific inkjet ink utilized, the printing method applied, and the desired properties and applications of the printed article.

The examples below are intended to further illustrate the inkjet inks and are not intended to limit the scope of the claims.

EXAMPLES

Inkjet Inks

Several example inkjet inks are given in Table 1 below. The amount of each component is expressed in terms of weight percentage relative to a total weight of 100%. RM=raw material. BYK-3550 is a silicone acrylate copolymer available from BYK Japan K.K. DERTOPHENE T115 is a terpene phenol resin available from DRT/Pinova. VALIFAST Black 3870 is a black azo-metal complex dye available from Orient Chemical Industries. As surfactants/agents: AMINON L-02 is a lauramide DEA available from Kao; AMIET 105 and AMIET 302 are polyoxyethylene aliphatic amines available from Kao; AMPHITOL 20N is a lauryldimethyl amine oxide available from Kao; AMPHITOL 24B is a lauryl betaine available from Kao; ELEC AC is an imidazole-based amphoteric surfactant available from Kao; and EMASOL L-10V is a sorbitan monolaurate available from Kao. * denotes the example is a comparative example in the tables below.

TABLE 1

Inkjet Ink Examples

| | RM | Example 1 | Example 2 | Example 3 | Example 4* | Example 5* | Example 6* | Example 7* | Example 8* |
|---|---|---|---|---|---|---|---|---|---|
| Ethanol | A169 | 67.20 | 67.20 | 67.20 | 67.20 | 67.20 | 67.20 | 68.20 | 67.20 |
| 1-propanol | A168 | 20.00 | 20.00 | 20.00 | 20.00 | 20.00 | 20.00 | 20.00 | 20.00 |
| isopropanolamine | — | 0.80 | 0.80 | 0.80 | 0.80 | 0.80 | 0.80 | 0.80 | 0.80 |
| BYK-3550 | — | 1.50 | 1.50 | 1.50 | 1.50 | 1.50 | 1.50 | 1.50 | 1.50 |
| DERTOPHENE T115 | — | 2.50 | 2.50 | 2.50 | 2.50 | 2.50 | 2.50 | 2.50 | 2.50 |
| VALIFAST BLACK 3870 | H135 | 7.00 | 7.00 | 7.00 | 7.00 | 7.00 | 7.00 | 7.00 | 7.00 |
| AMINON L-02 | — | 1.00 | — | — | — | — | — | — | — |
| AMIET 105 | — | — | 1.00 | — | — | — | — | — | — |
| AMIET 302 | — | — | — | 1.00 | — | — | — | — | — |
| AMPHITOL 20N | — | — | — | — | 1.00 | — | — | — | — |
| AMPHITOL 24B | — | — | — | — | — | 1.00 | — | — | — |
| ELEC AC | — | — | — | — | — | — | 1.00 | — | — |
| EMASOL L-10V | — | — | — | — | — | — | — | — | 1.00 |
| Total | | 100.00 | 100.00 | 100.00 | 100.00 | 100.00 | 100.00 | 100.00 | 100.00 |

Preparation Methods

To prepare the example inkjet inks, the terpene phenol resin was first combined with 1-propanol and mixed by magnetic stirrer for at least 30 minutes. The ethanol was then added to the mixture, along with the neutralization reagent (isopropanolamine) and silicon acrylate copolymer, and mixed for at least 15 minutes. The colorant was next added and mixed for at least 30 minutes. After that, the surfactants/agents were added slowly to the mixture while mixing for 15 minutes. Finally, the inkjet inks were filtered through a 1.0 μm filter and were then evaluated using the HP45SI cartridge made by Hewlett Packard.

Inkjet Ink Evaluation Methods

Printing Sample Preparation

Thermal printing technology related to Hewlett Packard was used to evaluate the inks (Software and hardware made by Inc.jet, Transport table made by Kirk Rudy). A white PET film was used for the printing substrate (U292W made by TEIJIN).

Dry Time Measurements

For evaluating dry times, the printing conditions utilized were as follows:

- Printing resolution; 600 dpi*300 dpi (vertical*horizontal)
- Printing speed; 100 feet/minute
- Driving voltage; 8.4 V
- Pulse length; 1.80 μs
- Pulse warming temperature; 40° C.
- Printing image; 100% duty (1 cm*10 cm, Monochrome bitmap, solid block image)
- Condition; 25° C., 30% humidity The abrasion test was done by the finger after specific time passed (10, 20, and 30 sec). A colored finger indicates not enough time has lapsed for complete drying ("NG", No Good), and a non-colored finger indicates the time is adequate for complete drying ("G", Good). A drying time of over 30 seconds was deemed unacceptable (slow drying) and a dry time of 30 seconds or under was deemed acceptable (quick drying).

Decap Time Measurements

For evaluating decap times, the printing conditions utilized were as follows:

- Printing resolution: 300 dpi*300 dpi (vertical*horizontal)
- Printing speed; 100 feet/minute
- Driving voltage; 8.4 V
- Pulse length; 1.80 μs
- Pulse warming temperature; 40° C.
- Printing image; 100% duty (1 mm*1 cm, Monochrome bitmap, narrow line image)
- Condition; 25° C., 30% humidity The narrow line image was printed to confirm that there were no missing nozzles included in the printed image. After confirming, the printhead was left decapped for a specific time (5 min, 10 min, or 1 h), then reprinted using the same narrow line image. The reprinted image (after the specific time lapse) was checked for any missing nozzles. If there were no missing nozzles, the inkjet ink was rated Good ("G") for that time interval. Otherwise, if missing nozzles are evident, the inkjet ink was rated No Good ("NG") for that time interval. Inkjet inks which maintain a "Good" decap classification when decapped (i.e., exposed to air) for 10 minutes or longer were deemed acceptable (have extended or prolonged decap times).

Print Quality (PQ) Measurements in a High-Volume Printing Operation

For evaluating the reliability of the inks during high-volume printing operations, the printing conditions utilized were as follows:

Printing resolution; 600 dpi*300 dpi (vertical*horizontal)
Printing speed; 100 m/minute
Driving voltage; 8.4 V
Pulse length; 1.80 μs
Pulse warming temperature: 40° C.
Printing image; 100% duty (see FIG. 1)
 1 mm*1 cm, Monochrome bitmap, Universal Product Code (UPC) 12 barcode image which reads "012345678912",
 2D Data Matrix which reads "Collins ink"
 Purge Bar supplied by Kao printing software
Condition; 25° C., 30% humidity The printing image was printed 500 times continuously and then the printing operation was stopped for 1 minute. After the 1 minute downtime, one additional printing image was printed (print #501) using the same printing conditions. The print quality of the first print (PQ print #1), the $500^{th}$ print (PQ print #500), and the $501^{st}$ print (PQ print #501, after the 1 minute downtime), were determined through visual inspection methods by checking for any missing nozzles. If there were no missing nozzles, the inkjet ink was rated Good ("G") for that print. Otherwise, if missing nozzles are evident, the inkjet ink was rated No Good ("NG") for that print. Inkjet inks which maintain a "Good" rating for each of print #1, print #500, and print #501 (after the 1 minute downtime) were deemed acceptable for high-volume printing operations.

Inkjet Ink Performance

TABLE 2

Inkjet Ink Performance

| Ink | | Example 1 | Example 2 | Example 3 | Example 4* | Example 5* | Example 6* | Example 7* | Example 8* |
|---|---|---|---|---|---|---|---|---|---|
| Printer Condition | | Old printing table, 40° C., 600*300 dpi, 100 m/min, (condition: 25° C., 30% humidity) | | | | | | | |
| PQ print #1 | | G | G | G | G | G | G | G | G |
| PQ print #500 | | G | G | G | G | G | G | G | G |
| PQ print #501 (after 1 min) | | G | G | G | NG | NG | NG | NG | NG |
| Decap time | 5 min | G | G | G | G | G | G | G | G |
| (open time) | 10 min | G | G | G | G | G | G | G | G |
| | 1 h | G | G | G | G | G | G | G | G |
| Dry time (sec) | 10 | NG | NG | NG | NG | NG | NG | NG | NG |
| 600*300 dpi, | 20 | NG | NG | NG | NG | NG | NG | NG | NG |
| 100% duty, Non-penetration substrate | 30 | G | G | G | G | G | G | G | G |

As shown in Table 2, inkjet inks containing a terpene phenol resin in combination with a compound (B) of the present disclosure (Examples 1-3) were characterized as both quick drying (achieve a "Good" rating with dry times of 30 seconds or less) and having extended decap times (maintain a "Good" decap classification when decapped for 10 minutes or longer). Further, these inks were also able to prevent static-induced nozzle clogging/plugging effects caused by statically charged environments, and provided high print quality during high-volume print operations even after 1 minute downtimes (PQ print #501 was the same as PQ print #500)(see e.g., FIG. 1, Examples 1 and 2).

On the other hand, inkjet inks in which compound (B) was removed (Comparative Example 7) or replaced with other surfactants/agents (Comparative Examples 4-6 and 8) provided poor print quality during high-volume print operations (PQ print #501 was Not Good compared to PQ print #500) (see e.g., FIG. 1, Example 7).

Where a numerical limit or range is stated herein, the endpoints are included. Also, all values and subranges within a numerical limit or range are specifically included as if explicitly written out.

As used herein the words "a" and "an" and the like carry the meaning of "one or more."

Obviously, numerous modifications and variations of the present invention are possible in light of the above teachings. It is therefore to be understood that, within the scope of the appended claims, the invention may be practiced otherwise than as specifically described herein.

All patents and other references mentioned above are incorporated in full herein by this reference, the same as if set forth at length.

The invention claimed is:

1. An inkjet ink, comprising:

(A) a terpene phenol resin;

(B) a compound of formula (I)

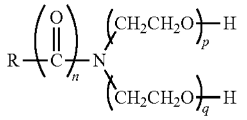

(I)

wherein:

R is an alkyl group having 8 to 22 carbon atoms or an alkenyl group having 8 to 22 carbon atoms, n is 0 or 1, p is an integer from 1 to 40, and q is an integer from 1 to 40;

(C) an alkanolamine which is at least one selected from the group consisting of propanolamine, isopropanolamine, and triethanolamine;

(D) ethanol; and (E) 1-propanol, wherein a combined weight of ethanol (D) and 1-propanol (E) ((D)+(E)) in the inkjet ink is 50 to 95 wt. %, based on a total weight of the inkjet ink, a weight ratio of ethanol (D) to 1-propanol (E) ((D):(E)) is 3:1 to 4:1, and the inkjet ink is substantially free of 1-butanol.

2. The inkjet ink of claim 1, wherein the terpene phenol resin (A) is a copolymer formed from a reaction between a monoterpene and a phenolic compound comprising at least one hydroxyl group and at least two replaceable hydrogen atoms in ortho- and/or para-positions with respect to the at least one hydroxyl group.

3. The inkjet ink of claim 2, wherein the monoterpene is at least one bicyclic monoterpene selected from the group consisting of 3-carene, α-pinene, β-pinene, and camphene.

4. The inkjet ink of claim 2, wherein the phenolic compound is phenol.

5. The inkjet ink of claim 1, wherein the terpene phenol resin (A) has a hydroxyl value of 10 to 75 mgKOH/g.

6. The inkjet ink of claim 1, wherein the terpene phenol resin (A) is present in an amount of 0.1 to 10 wt. %, based on a total weight of the inkjet ink.

7. The inkjet ink of claim 1, wherein the compound (B) is present in an amount of up to 5 wt. %, based on a total weight of the inkjet ink.

8. The inkjet ink of claim 1, wherein a weight ratio of the terpene phenol resin (A) to the compound (B) ((A):(B)) is 1:1 to 5:1.

9. The inkjet ink of claim 1, wherein n is 0.

10. The inkjet ink of claim 1, wherein n is 1.

11. The inkjet ink of claim 1, wherein the alkanolamine (C) is present in an amount of 0.1 to 10 wt. %, based on a total weight of the inkjet ink.

12. The inkjet ink of claim 1, wherein the alkanolamine (C) is isopropanolamine.

13. The inkjet ink of claim 1, further comprising (F) a silicone acrylate copolymer, wherein the silicone acrylate copolymer (F) is present in an amount of up to 5 wt. %, based on a total weight of the inkjet ink.

14. The inkjet ink of claim 1, further comprising (G) a colorant.

15. A printed article, comprising:

a substrate and a dried form of the inkjet ink of claim 1 disposed on the substrate.

16. A method of forming a printed image on a substrate, comprising:

applying the inkjet ink of claim 1 onto the substrate with a thermal inkjet printhead; and drying the inkjet ink.

17. The method of claim 16, wherein the inkjet ink is dried by leaving exposed to air for 30 seconds or less.

18. The method of claim 16, wherein a heater is not employed for drying the inkjet ink.

19. The inkjet ink of claim 1, wherein the inkjet ink is substantially free of 2-propanol.

* * * * *